UNITED STATES PATENT OFFICE 2,566,084

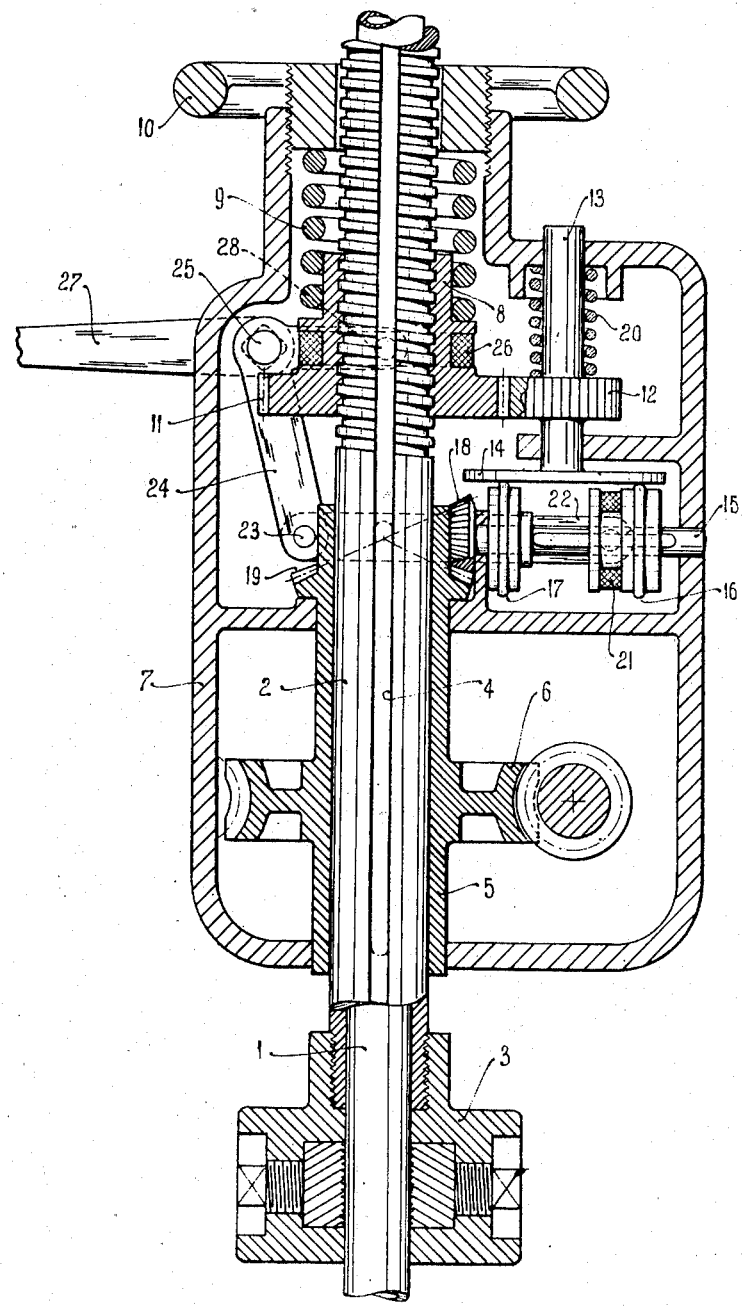

ROTARY DRILL

Cornelis J. Esseling, Haarlem, Netherlands, assignor to Werf Conrad en Stork Hijsch N. V., Haarlem, Netherlands, a company of the Netherlands Application April 22, 1948, Serial No. 22,589
In the Netherlands April 30, 1947

12 Claims. (Cl. 255—22)

This invention relates to a rotary drill for drilling into a rock formation, as for example, in oil well drilling, the drill being provided with means for controlling the pressure exerted on the bit and of the type wherein the bit is fed, i. e. is worked downward, if a nut on the threaded grief stem is rotated at a speed different from that of said stem. Rotation of the nut is derived from that of said stem, and the transmission gear between stem and nut comprises a coupling member which, whenever the grief stem moves downward, is automatically thrown in so as to adjust the nut. In known rotary drills of this type, the nut is provided with an abutment for the lower end of a coiled spring, which encircles the grief stem and whose upper end bears against an abutment of a tensioning member, such as a handwheel, adapted to be screwed up and down in a stationary housing enclosing the nut and the coupling member.

Owing to the presence of a coupling member in the transmission gear between the grief stem and the nut in a rotary drill of the type referred to, the pressure on the bit cannot remain constant during a comparatively long period. This said pressure, which is transmitted to the bit through the nut and the grief stem, is relieved whenever the coupling member is thrown in. During this operation the pressure is exerted on the stationary casing instead on the grief stem. In practice, this has proved to be an inconvenience.

It is the object of this invention to avoid this drawback. With this object in view, the invention consists in deriving the rotation of the nut from that of the grief stem through transmission gear comprising a speed change gear, the operating member of which is associated with the nut in such manner that downward motion of the nut causes the rotary speed of the nut to increase, and vice versa.

Preferably, the speed change gear comprises two friction disks, the axes of which intersect at right angles. One of the discs can be radially displaced across and in contact with the face of the other by means of said operating member.

The somewhat diagrammatic drawing illustrates a vertical sectional view of a preferred embodiment of the invention.

1 is the drilling rod, to the lower end (not shown) of which the bit is secured. Said rod is secured to the grief stem 2 through the drilling head 3. Stem 2 has a longitudinal key way 4 for a key, by means of which it has freedom of vertical movement only in a sleeve 5, which is adapted to be rotated through a worm gear 6 secured thereto. Sleeve 5 is journaled in the stationary housing 7.

The upper portion of the grief stem is provided with a left handed screw thread cooperating with a nut 8. A coil spring 9, which encircles this portion of the grief stem and is adapted to be tensioned by a hand wheel 10 screwed into the casing 7, exerts pressure, through a ball bearing not shown, on the nut 8, so that the pressure on the bit can be increased or decreased by rotating the hand wheel in one or the other direction.

Nut 8 is integral with a gear wheel 11 meshing with a pinion 12. This latter is keyed to a spindle 13, which is rotatably supported in housing 7 and secured to the lower end of the spindle is a horizontal friction disc 14. Splined on a radially extending, horizontal spindle 15, also rotatable in bearings of housing 7, is a friction disk 16, and loosely rotatable about spindle 15 is a supporting disk 17. Keyed to the inner end of spindle 15 is a bevel pinion 18 meshing with a bevel gear 19 on sleeve 5. Disc 14 is urged into contact with the circumferences of discs 16 and 17 through a coiled spring 20, which encircles the vertical spindle 13 and bears down upon pinion 12.

Disc 16 is provided with a slip ring 21 fitted with diametrically opposed studs, which are hinged, through rods 22 and a pivot 23, to one arm of a bell crank lever 24 keyed to a shaft 25, the second arm of said bell crank being pivoted as at 28 to a pivot member in the form of a slip ring 26 of nut 8. Shaft 25 is supported in bearings of housing 7, and secured thereto is a handle 27.

The device described so far operates as follows, assuming that the grief stem 2 is rotated in clockwise direction and spring 9 is unloaded, so that the bit exerts no appreciable pressure on the bottom of the bore hole, while further assuming disc 16 to be so adjusted that nut 8 rotates at the same speed (and, in accordance with the drawing, in the same direction) as stem 2. This position of disc or roller 16 will be termed "neutral position."

It will be understood that under these conditions grief stem 2 will not, or at least not appreciably work downward. If, however, spring 9 is tensioned by means of hand wheel 10, stem 2 will gradually descend, together with nut 8. This downward movement of the nut immediately causes disc 16 to move radially inward across disc 14 by outward movement of lever arm 24 due to lowering of pivot connection 28 on slip ring 26, whereby the rotary speed of nut 8 is increased by speeding up of pinion 12 and increasing rotation of gear 11 to a value exceeding that of stem 2, the result being that nut 8 is screwed upward upon the thread of the mentioned stem. This rising of nut 8 again causes disc 16 to be forced outward on spindle 15 and the rotary speed of nut 8 to decrease by lever arm 24 swinging inward when pivot connection is raised with nut 8. If the rate of feed of the bit is constant (which will be the case when the hardness of the rock or other stratum encountered by the bit remains constant), disc 16 will assume a position of substantial equilibrium wherein nut 8 is screwed upward at the same speed at which stem 2 descends. If now the bit encounters rock strata of greater hardness, so that the rate of feed decreases, nut 8 will initially continue to rotate at the same speed and thereby be screwed upward, with the result that disc 16 is forced outward on spindle 15, until another position of equilibrium of nut 8 is attained. By above described operation of the friction discs 14 and 16, nut 8 is held at a substantially stationary level relative to the supporting housing. If nut 8 were allowed to move downward with grief stem 1, tension of spring 9 would diminish. However, since the distance between nut 8 and hand wheel 10 remains substantially the same during the entire operation, pressure on nut 8 remains constant, and nut 8, acting as a flange on grief stem 1, feeds the grief stem downward.

If handle 27 is depressed, the bit is raised, due to disc 16 being moved outward beyond "zero position," whereby the rotary speed of nut 8 decreases to a value below that of stem 2 and the latter consequently screws itself upwards through the nut.

What I claim is:

1. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and positively driving said grief stem; of a second gear rigidly connected to the drive gear and slidable therewith upon said grief stem; supporting means in said housing rotatably engaging said second gear and said drive gear; adjustable means for exerting pressure on said feed nut in the direction of said drill bit; variable transmission means operatively interconnecting the said second gear with the said first gear on said feed nut for variably driving the latter including two gear members shiftable relatively to each other so as to result in turning said feed nut relative to said grief stem when said gear members are shifted relative to one another; a bell crank lever pivotably mounted in said housing to rock on an axis spaced a distance from the central axis of said grief stem; means upon one arm of the lever for engaging said feed nut and following axial movement of the feed nut while allowing the latter to rotate freely; and means upon the other arm of said lever connected to one of the gear members of said variable transmission means to shift said gear member relative to the other gear member of said variable transmission means to vary and thereby alter the relative speed of rotation of said feed nut with respect to said second gear in accordance with the axial position and movement of said feed nut on the thread of said grief stem.

2. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and for positively driving said grief stem; of a second gear rigidly connected to the drive gear and slidable therewith upon said grief stem; supporting means in said housing for rotatably engaging said second gear and said drive gear; manually adjustable means for exerting pressure on said feed nut in the direction of said drill bit; variable transmission means operatively interconnecting the said second gear with the said first gear on said feed nut for variably driving the latter including two gear members shiftable relatively to each other so as to result in turning said feed nut relative to said grief stem when said gear members are shifted relative to one another; a bell crank lever pivotably mounted in said housing to rock on an axis spaced a distance from the central axis of said grief stem; means upon one arm of the lever for engaging said feed unit and following axial movement of the feed nut while allowing the latter to rotate freely; a handle rigidly connected to the lever and extending exteriorly of said housing into accessible position for manually operating said lever at will independently of automatic operation thereof; and means upon the other arm of said lever connected to one of the gear members of said variable transmission; means to shift said gear member relative to the other gear member of said variable transmission means and thereby alter the relative speed of rotation of said feed nut with respect to said second gear in accordance with the axial position and movement of said feed nut on the thread of said grief stem.

3. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and positively driving said grief stem; of a second gear rigidly connected to the drive gear and slidable therewith upon said grief stem; supporting means in said housing rotatably engaging said second gear and drive gear; a manually adjustable member screwed into said casing in axial alignment with said grief stem; a compression spring extending from said adjustable member to said feed nut and encircling said grief stem; variable transmission means operatively interconnecting said second gear with said first gear on said feed nut for variably driving the latter including two gear members shiftable relatively to each other so as to result in turning said feed nut relative to said grief stem when said gear members are shifted relative to one another; a bell crank lever pivotably mounted in said housing to rock on an axis spaced a distance from the central axis of said grief stem; annular guide means on said feed nut; means connected to one arm of the lever for engaging with the annular guide means and causing said arm to follow axial movement of said feed nut while allowing the latter to rotate freely; means upon the other arm of said lever connected to one of the gear members of said variable transmission means to shift said gear member relative to the other gear member of said variable transmission means and thereby alter the relative speed of rotation of said feed nut with respect to said second gear in accordance with the axial position and movement of said feed nut with the axial position and movement of said feed nut on the thread of said grief stem; and manual means for rocking said lever upon a pivot mounting for operating said lever independently of the operation of said variable transmission.

4. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and positively driving said grief stem: of a second gear rigidly connected to the drive gear and slidable therewith upon said grief stem; supporting means in said housing rotatably engaging said second gear and said drive gear; adjustable means for exerting pressure on said feed nut in the direction of said drill bit; a pinion shaft rotatably mounted in said housing and spaced a predetermined distance from said grief stem in parallelism thereto; a friction disc fixed on said pinion shaft to rotate therewith; a second shaft rotatably mounted in said housing in substantially the same plane with the pinion shaft and disposed at right angles thereto; a pinion fixed on said pinion shaft and meshing with the gear secured to said feed nut; a second pinion fixed on said second shaft and meshing with said second gear for driving the pinion shaft thereby; a second friction disc slidably mounted on said second shaft and engaging frictionally with the friction disc on said pinion shaft; means urging the latter disc into constant operative contact with the second friction disc; means causing said second friction disc to rotate positively with said second shaft; annular guide means upon said second friction disc; a bell crank lever pivotally mounted in said housing to rock on an axis spaced a distance from the central axis of said grief stem; annular guide means upon the feed nut; means upon one arm of the lever for engaging with and following the annular guide means of said feed nut in all axial movements thereof on said grief stem; a movable member connected at one end to the other arm of said lever and at the other end thereof having means for engaging with the annular guide means upon the second friction disc for sliding the latter upon its shaft across the surface of the disc on said pinion shaft in accordance with the rocking of said lever occasioned by axial movement of said feed nut; and auxiliary means for operating said lever independently of the automatic operation of the gears and friction discs and thereby axially moving said feed nut at will.

5. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and for positively driving said grief stem: of a second gear rigidly connected to the drive gear and slidable therewith upon said grief stem; supporting means in said housing rotatably engaging said second gear and said drive gear; manually adjustable means for exerting pressure on said feed nut in the direction of said drill bit; a pinion shaft rotatably mounted in said housing and spaced a predetermined distance from said grief stem in parallelism thereto; a friction disc fixed on said pinion shaft to rotate therewith; a second shaft rotatably mounted in said housing in substantially the same plane with the pinion shaft and disposed at right angles thereto; a pinion fixed on said pinion shaft and meshing with the gear secured to said feed nut; a second pinion fixed on said second shaft and meshing with said second gear for driving the pinion shaft thereby; a second friction disc slidably mounted on said second shaft and engaging frictionally with the friction disc on said pinion shaft; means urging the latter disc on said pinion shaft; means urging the latter disc into constant operative contact with the second friction disc; means causing said second friction disc to rotate positively with said second shaft; annular guide means upon said second friction disc; a bell crank lever pivotally mounted in said housing to rock on an axis spaced a distance from the central axis of said grief stem; annular guide means upon the feed nut; means upon one arm of the lever for engaging with and following the annular guide means of said feed nut in all axial movements thereof on said grief stem; a movable member connected at one end to the other arm of said lever and at the other end thereof having means for engaging with the annular guide means upon the second friction disc for sliding the latter upon its shaft across the surface of the disc on said pinion shaft in accordance with the rocking of said lever occasioned by axial movement of said feed nut; a handle rigidly connected to the lever and extending exteriorly of said housing into accessible position for manually operating said lever at will independently of automatic operation thereof; and means upon the other arm of said lever connected to one of the gear members of said variable transmission in effective position to shift said gear member relative to the other gear member of said variable transmission means and thereby alter the relative speed of rotation of said feed nut with respect to said second gear in accordance with the axial position and movement of said feed nut on the thread of said grief stem.

6. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and positively driving said grief stem: of a second gear rigidly connected to the drive gear and slidable therewith upon said grief stem; supporting means in said housing rotatably engaging said second gear and said drive gear; manually adjustable means for exerting pressure on said feed nut in the direction of said drill bit; annular guide means on said feed nut; a slip ring rotatably mounted on the annular guide means; a bell crank lever pivotally mounted in said housing to rock on an axis spaced a distance from the central axis of said grief stem; a pivot member connecting one arm of the lever with the slip ring and causing said arm to follow axial movement of said feed nut while allowing the latter to rotate freely; a pinion shaft rotatably mounted in said housing and spaced a predetermined distance from said grief stem in parallelism thereto; a friction disc fixed on said pinion shaft to rotate therewith; a second shaft rotatably mounted in said housing in substantially the same plane with the pinion shaft and disposed at right angles thereto; a pinion fixed on said pinion shaft and meshing with the gear secured to said feed nut; a second pinion fixed on said second shaft and meshing with said second gear for driving the pinion shaft thereby; a second friction disc slidably mounted on said second shaft and engaging frictionally with the friction disc on said pinion shaft; means urging the latter disc into constant operative contact with the second friction disc; means causing said second friction disc to rotate positively with said second shaft; annular guide means upon said second friction disc; a second slip ring rotatably mounted on the annular guide means on said second friction disc; a movable member pivotably connected at one end to the other arm of said lever and at the other end having further pivot means connected to said second slip ring for causing the second friction disc to slide upon its shaft across the surface of the disc upon the pinion shaft in accordance with the rocking of said lever occasioned by axial movement of said feed nut; a handle rigidly connected to the lever and extending exteriorly of said housing into accessible position for manually operating said lever at will independently of automatic operation thereof; and means upon the other arm of said lever connected to one of the gear members of said variable transmission means to shift said gear member relative to the other gear member of said variable transmission means and thereby alter the relative speed of rotation of said feed nut with respect to said second gear in accordance with the axial position and movement of said feed nut on the thread of said grief stem.

7. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a drive gear mounted on said grief stem in slidable relation therewith and positively driving said grief stem: of a sleeve secured to and slidable with said drive gear on said grief stem; a second gear secured upon the sleeve and spaced a distance from said drive gear; supporting means in said housing for said sleeve; adjustable means for exerting pressure on said feed nut in the direction of said drill bit; a pinion shaft rotatably mounted in said housing and spaced a predetermined distance from said grief stem in parallelism therewith; a friction disc fixed on one end of the pinion shaft and having a working face on the side opposite the pinion shaft; a second shaft rotatably mounted in said housing in substantially the same plane with the pinion shaft and disposed at right angles thereto and to the working face of the friction disc on the pinion shaft; a spring encircling said pinion shaft and extending from an interior portion of said housing to the pinion on said pinion shaft and urging the working face of the friction disc on the latter into constant operative contact with the second friction disc; means causing the latter disc to rotate positively with said second shaft; further annular guide means on the second friction disc; a second slip ring rotatably mounted on the further annular guide means; a pivot member connecting one arm of the lever with the slip ring associated with the feed nut; an elongated member connected at one end to the other arm of said lever; a pivot member on the other end of said elongated member connecting the latter to said second slip ring and causing the second friction disc to move across the working face of the friction disc on the end of said pinion shaft in response to axial movement of said feed nut; a handle rigidly connected to the lever and extending exteriorly of said housing into accessible position for manually operating said lever at will independently of automatic operation thereof; and means upon the other arm of said lever connected to one of the gear members of said variable transmission means to shift said gear member relative to the other gear member of said variable transmission means and thereby alter the relative speed of rotation of said feed nut with respect to said second gear in accordance with the axial position and movement of said feed nut on the thread of said grief stem.

8. In a rotary drill of the type provided with automatic control of the pressure exerted on the drill bit, the combination, with a housing; a threaded grief stem extending rotatably through the housing and adapted at one end to be connected to a drill stem; a feed nut operatively mounted on the thread of the grief stem; a first gear secured to the feed nut for rotating the same; and a worm gear mounted on said grief stem in slidable relation therewith and conditioned for positively driving said grief stem: of a driven worm extending rotatably into said housing and meshing with said worm gear for driving the latter; a sleeve secured to said worm gear and supporting the same upon said grief stem; bearing means in said housing rotatably supporting said sleeve; a bevel gear fixed upon said sleeve; a rotatable pinion shaft mounted in said housing and spaced a distance from the grief stem in parallelism therewith; a pinion fixed upon said pinion shaft in mesh with the gear on said feed nut, the latter having an annular groove therein; a slip ring rotatably mounted in said groove; a substantially flat friction disc secured upon one end of said pinion shaft; a second shaft rotatably mounted in said housing substantially located in the same plane with the pinion shaft and the grief stem and at right angles thereto while being spaced a distance from the friction disc; a bevel pinion fixed upon the second shaft and meshing with the bevel gear on said sleeve for driving said second shaft from the grief stem; a second friction disc slidable upon said second shaft; means causing said second disc to rotate positively with said second shaft, the latter disc having an annular groove therein and a second slip ring rotatably mounted in the latter groove; means resiliently disposed between an interior portion of said housing and the pinion on said shaft and urging the disc on said pinion shaft into continuous contact with said second disc; a bell crank lever pivotally mounted within said housing with one arm thereof disposed generally in a lateral direction transverse to the axis of the grief stem and the other arm depending from the pivotal mounting of said lever; an elongated member pivotally connected at one end to the lower end of the depending lever arm and having pivot means at the other end thereof connecting the same to the second slip ring; further pivot means connecting the end of the lateral arm of said lever with the slip ring associated with the feed nut; and a manual means extending accessibly exteriorly of said housing for operating said bell crank lever at will independently of the automatic operation of the friction discs and feed nut.

9. In a rotary drill in combination, a stationary support; a stem; bearing means associated with said stationary support and supporting said stem slidable in axial direction and turnable about its axis; means for turning said stem; a feed member mounted on said stem adjustably in axial direction thereof; pressure means permanently tending to force the said feed member in the direction of feed of said stem, so as to slide said stem by means of said feed member in direction of feed; and adjusting means mounted on said stationary support for automatically moving said feed member relative to said stem against the direction of feed during rotation and feed movement of said stem, so as to maintain the position of said feed member relative to said stationary support substantially unchanged during operation of the drill.

10. In a rotary drill in combination, a stationary support; a stem; bearing means associated with said stationary support and supporting said stem slidable in axial direction and turnable about its axis; means for turning said stem; a feed member mounted on said stem engaging the same so as to be adapted to move said stem in direction of feed, the position of said feed member relative to said stem being, however, adjustable in axial direction of said stem; pressure means permanently tending to force said feed member in direction of feed of said stem so as to slide said stem by means of said feed member in direction of feed; and adjusting means mounted on said support for automatically moving said feed member relative to said stem against the direction of feed of said stem into a predetermined relative position to said stationary support whenever during rotation and feed movement of said stem said feed member moves from said predetermined relative position in direction of feed, thereby maintaining the position of said feed member relative to said stationary support substantially unchanged during the entire operation of the drill.

11. In a rotary drill in combination a stationary support; a stem having a threaded portion; bearing means associated with said stationary support and supporting said stem slidable in axial direction and turnable about its axis; means for turning said stem; a feed member having a threaded opening fitting on said threaded portion of said stem engaging the same so that said feed member is adapted to move said stem in direction of feed, the position of said feed member relative to said stem being, however, adjustable in axial direction of said stem; pressure means permanently tending to force said feed member in direction of said stem so as to slide said stem by means of said feed member in direction of feed; and adjusting means mounted on said support for automatically turning said feed member relative to said stem so as to move said feed member relative to said stem against the direction of feed of said stem into a predetermined relative position to said stationary support whenever, during rotation and feed movement of said stem, said feed member moves from said predetermined relative position in direction of feed, thereby maintaining the position of said feed member relative to said stationary support substantially unchanged during the entire operation of the drill.

12. A rotary drill comprising in combination, a drill stem, a threaded grief stem secured to said drill stem; drive gear means slidably connected with, and rotating said grief stem; a feed nut mounted on the thread of the said grief stem; a slidable gear mounted on, and rotating with said grief stem; a stationary support supporting said grief stem rotatably, and slidably in axial direction; adjustable means for exerting pressure in direction of feed on said feed nut; gear means for rotating said feed nut; variable transmission means intermediate of said slidable gear and said gear means including at least two members shiftable relative to each other, so as to convey a variable rotative speed to said feed nut; actuating means intermediate of said feed nut and said variable transmission means adapted to shift said shiftable means in such manner that any movement of the feed nut in the direction of feed causes an increase of the rotary speed of said feed nut relative to said grief stem and vice versa, whereby said feed nut is screwed on said threaded grief stem in a direction opposed to its aforesaid movement, and held on a substantially stationary level relative to said stationary support during the entire operation.

CORNELIS J. ESSELING.

REFERENCES CITED

The following references are of record in the file of this patent:

UNITED STATES PATENTS

| Number | Name | Date |
| --- | --- | --- |
| 492,567 | Worcester et al. | Feb. 28, 1893 |
| 1,873,404 | Hild | Aug. 23, 1932 |